(12) United States Patent
Christopher et al.

(10) Patent No.: US 9,779,047 B2
(45) Date of Patent: Oct. 3, 2017

(54) UNIVERSAL INTELLIGENT PLATFORM MANAGEMENT INTERFACE (IPMI) HOST TO BASEBOARD MANAGEMENT CONTROLLER (BMC) COMMUNICATION FOR NON-X86 AND LEGACY FREE SYSTEMS

(71) Applicant: American Megatrends, Inc., Norcross, GA (US)

(72) Inventors: Samvinesh Christopher, Suwanee, GA (US); Anurag Bhatia, Lilburn, GA (US); Winston Thangapandian, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 275 days.

(21) Appl. No.: 14/818,981

(22) Filed: Aug. 5, 2015

(65) Prior Publication Data
US 2017/0039151 A1 Feb. 9, 2017

(51) Int. Cl.
| | |
|---|---|
| *G06F 13/12* | (2006.01) |
| *G06F 15/16* | (2006.01) |
| *G06F 13/362* | (2006.01) |
| *G06F 13/40* | (2006.01) |
| *G06F 13/42* | (2006.01) |

(52) U.S. Cl.
CPC ........ *G06F 13/362* (2013.01); *G06F 13/4068* (2013.01); *G06F 13/4282* (2013.01); *G06F 15/16* (2013.01)

(58) Field of Classification Search
CPC .............................. G06F 13/105; G06F 13/20
USPC .......................................................... 710/113
See application file for complete search history.

(56) References Cited

U.S. PATENT DOCUMENTS

| | | | | |
|---|---|---|---|---|
| 8,069,257 | B1* | 11/2011 | Bhatia | G06F 13/105 345/501 |
| 8,898,349 | B1* | 11/2014 | Mondal | G06F 11/3068 710/15 |
| 2009/0055157 | A1* | 2/2009 | Soffer | G06F 15/7864 703/27 |
| 2013/0151841 | A1* | 6/2013 | McGraw | G06F 11/3006 713/100 |

(Continued)

*Primary Examiner* — Titus Wong
(74) *Attorney, Agent, or Firm* — Locke Lord LLP; Tim Tingkang Xia, Esq.

(57) ABSTRACT

Aspects of the disclosure relate to systems and methods for performing a universal Intelligent Platform Management Interface (IPMI) host-to-baseboard management controller (BMC) communication. The system includes a management device communicatively connected to a computing device through a communication link, such as a universal serial bus (USB) interface. In operation, the management device identifies itself to the computing device as a generic human interface device (HID) pipe device. Thus, a HID channel is established between the management device and the computing device through the USB interface. When the management device receives a first message from the computing device directed toward the generic HID pipe device through the HID channel, the management device may determine whether the message is an IPMI message intended for communicating with the management device. When the message is the IPMI message, the management device processes the IPMI message.

24 Claims, 3 Drawing Sheets

(56) References Cited

U.S. PATENT DOCUMENTS

2013/0346666 A1* 12/2013 Chang ................... G06F 13/20
710/313

* cited by examiner

UNIVERSAL INTELLIGENT PLATFORM MANAGEMENT INTERFACE (IPMI) HOST TO BASEBOARD MANAGEMENT CONTROLLER (BMC) COMMUNICATION FOR NON-X86 AND LEGACY FREE SYSTEMS

FIELD

The present disclosure relates generally to Intelligent Platform Management Interface (IPMI) and baseboard management controller (BMC) technology, and more particularly to systems and methods of performing universal IPMI host-to-BMC communication, which may be used for non-x86 and legacy free systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

IPMI is an industry standard for system monitoring and event recovery. Currently, BMC chips fully support the IPMI Specification version 2.0 (hereinafter the IPMI v2.0), which is publicly available from INTEL CORPORATION, and is incorporated herein by reference. The IPMI v2.0 provides a common message-based interface for accessing all of the manageable features in a compatible computer. The IPMI Specification was written when PC servers are mainly designed using x86 architecture and thus adopts x86 specific methods for some of the functionalities. However, there are other CPU architectures, such as ARM or PowerPC that are non-x86 and/or legacy free systems, which may be used to design PC servers. When these non-x86 and/or legacy free systems are used, it may be difficult and sometimes impossible for the IPMI functionalities to use the x86 methods. This leads to limited IPMI functionalities on these non-x86 and/or legacy free systems and architectures.

Therefore, an unaddressed need exists in the art to address the aforementioned deficiencies and inadequacies.

SUMMARY

In one aspect, the present disclosure relates to a system, which includes a management device communicatively connected to a computing device through a communication link. The management device includes a processor and a storage device storing computer executable code. The computer executable code, when executed at the processor, is configured to: identify the management device as a human interface device (HID) device to the computing device through the communication link, wherein a type of the identified HID device is a generic HID pipe device; and in response to receiving a first message from the computing device directed toward the generic HID pipe device through the communication link, determine whether the first message is an Intelligent Platform Management Interface (IPMI) message intended for communication with the management device, or an HID command intended for communication with the HID device; and when the first message is the IPMI message, process the IPMI message.

In certain embodiments, the management device is a baseboard management controller (BMC), and the computing device functions as a host computer to the BMC.

In certain embodiments, the computing device is a non-x86 computer device or a legacy free computing device.

In certain embodiments, the communication link is a universal serial bus (USB) link.

In certain embodiments, the computing device includes a HID processing module configured to: recognize a device connected to the computing device through the communication link as the HID device; receive an identifying message from the recognized HID device to identify the type of the recognized HID device; and establish a HID channel to the identified HID device through the communication link. In certain embodiments, the type of the recognized HID device includes a keyboard, a mouse, and the generic HID pipe device.

In certain embodiments, the computing device further includes an IPMI processing module configured to: when the HID processing module identifies the HID device as the generic HID pipe device, generate the IPMI message to be transmitted to the generic HID pipe device, and transmit the IPMI message to the generic HID pipe device through the HID channel.

In certain embodiments, the computer executable code includes: an identification module configured to identify the management device as the generic HID pipe device to the computing device; a determination module configured to determine whether the first message is the IPMI message or the HID command; and an IPMI module configured to process the IPMI message.

In certain embodiments, the IPMI processing module is further configured to: receive an IPMI response message in response to the IPMI message from the generic HID pipe device through the HID channel; and process the IPMI response message. In certain embodiments, the IPMI module is further configured to: generate the IPMI response message in response to the IPMI message; and transmit the IPMI response message to the computing device through the HID channel.

In another aspect, the present disclosure relates to a method for performing a universal IPMI communication between a management device and a computing device. In certain embodiments, the method includes: identifying, by the management device to the computing device through a communication link, the management device as a HID device, wherein a type of the identified HID device is a generic HID pipe device; and in response to receiving, by the management device, a first message from the computing device directed toward the generic HID pipe device through the communication link, determining, by the management device, whether the first message is an IPMI message intended for communication with the management device, or an HID command intended for communication with the HID device; and when the first message is the IPMI message, processing, by the management device, the IPMI message.

In certain embodiments, the management device is a BMC, the computing device functions as a host computer to the BMC, and the communication link is a USB link. In certain embodiments, the computing device is a non-x86 computer device or a legacy free computing device.

In certain embodiments, the computing device includes: a HID processing module configured to: recognize a device connected to the computing device through the communication link as the HID device; receive an identifying message from the recognized HID device to identify the type of the recognized HID device; and establish a HID channel to the identified HID device through the communication link; and an IPMI processing module configured to, when the HID processing module identifies the HID device as the generic HID pipe device: generate the IPMI message to be transmitted to the generic HID pipe device; and transmit the IPMI message to the generic HID pipe device through the HID channel.

In certain embodiments, the type of the recognized HID device includes a keyboard, a mouse, and the generic HID pipe device.

In certain embodiments, the IPMI processing module is further configured to: receive an IPMI response message in response to the IPMI message from the generic HID pipe device through the HID channel; and process the IPMI response message.

In certain embodiments, the method further includes: generating, by the management device, the IPMI response message in response to the IPMI message; and transmitting, by the management device, the IPMI response message to the computing device through the HID channel.

A further aspect of the present disclosure relates to a non-transitory computer readable medium storing computer executable code. The computer executable code, when executed at a processor of a management device, is configured to: identify the management device as a HID device to a computing device through a communication link, wherein a type of the identified HID device is a generic HID pipe device; and in response to receiving a first message from the computing device directed toward the generic HID pipe device through the communication link, determine whether the first message is an IPMI message intended for communication with the management device, or an HID command intended for the communication with the HID device; and when the first message is the IPMI message, process the IPMI message.

In certain embodiments, the management device is a BMC, the computing device functions as a host computer to the BMC, and the communication link is a USB link. In certain embodiments, the computing device is a non-x86 computer device or a legacy free computing device.

In certain embodiments, the computing device includes: a HID processing module configured to: recognize a device connected to the computing device through the communication link as the HID device; receive an identifying message from the recognized HID device to identify the type of the recognized HID device; and establish a HID channel to the identified HID device through the communication link; and an IPMI processing module configured to, when the HID processing module identifies the HID device as the generic HID pipe device: generate the IPMI message to be transmitted to the generic HID pipe device; and transmit the IPMI message to the generic HID pipe device through the HID channel.

In certain embodiments, the type of the recognized HID device includes a keyboard, a mouse, and the generic HID pipe device.

In certain embodiments, the computer executable code includes: an identification module configured to identify the management device as the generic HID pipe device to the computing device; a determination module configured to determine whether the first message is the IPMI message or the HID command; and an IPMI module configured to process the IPMI message.

In certain embodiments, the IPMI processing module is further configured to: receive an IPMI response message in response to the IPMI message from the generic HID pipe device through the HID channel; and process the IPMI response message. In certain embodiments, the IPMI module is further configured to: generate the IPMI response message in response to the IPMI message; and transmit the IPMI response message to the computing device through the HID channel.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The term "human interface device" or its abbreviation "HID", as used herein, generally refer to a type of computer device that interacts directly with, and most often takes input from, humans and may deliver output to humans. Specifically, the term "HID" most commonly refers to the USB-HID specification.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

As disclosed above, IPMI Specification was written when PC servers are mainly designed using x86 architecture and thus adopts x86 specific methods for some of the functionalities. However, when non-x86 and/or legacy free systems such as ARM or PowerPC are used, it may be difficult and sometimes impossible for the IPMI functionalities to use the x86 methods. This leads to limited IPMI functionalities on these non-x86 and/or legacy free systems and architectures.

One of the major limitations to the IPMI functionalities is the host to BMC communication using IPMI. The IPMI Specification defines certain system interfaces for transferring of IPMI messages between the BMC and the host computer, such as a keyboard controller style (KCS) interface, a block transfer (BT) interface, and a system management interface chip (SMIC) interface. The KCS interface is based on a legacy keyboard controller interface, which is a slow speed communication interface using single byte transfer and x86 technology such as low pin count (LPC) and input/output (I/O) ports. The I/O access is x86 specific, and is not available in other architectures. The LPC interface, which is defined by Intel, is mainly used to access SuperIO, which host slow speed peripherals such as a keyboard, a mouse, or serial ports. Thus, for IPMI, it becomes logical to use the slow speed KCS interface together with LPC.

With the advent of the USB interface, PC designers now may design legacy free designs by eliminating the LPC and IO interfaces in favor of low cost USB based devices. Thus, in some of the non-x86 or legacy free systems, there is no SuperIO and/or LPC interfaces available. In order to implement IPMI with the KCS interface, adding SuperIO and/or LPC interfaces on these systems may be expensive.

Accordingly, certain aspects of the present disclosure direct to systems and methods of performing universal IPMI host-to-BMC communication, in which communication through the KCS interface is replaced by a new technique that may be used for non-x86 and legacy free systems. This new technique also may work for the legacy x86 systems.

Figure 1:
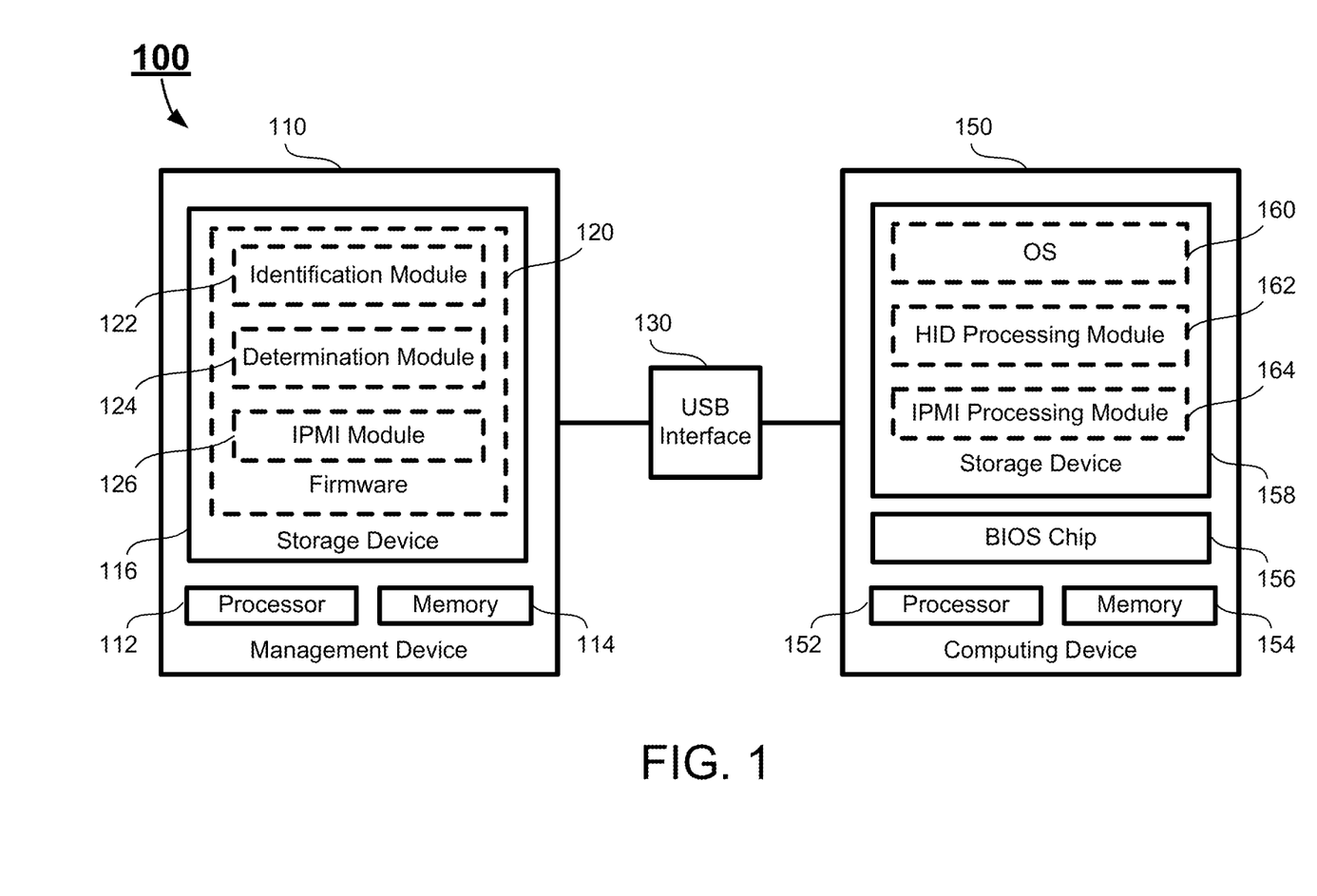
FIG. 1 schematically depicts an exemplary system according to certain embodiments of the present disclosure.

In accordance with the purposes of present disclosure, as embodied and broadly described herein, in certain aspects, the present disclosure relates to a computer system 100. FIG. 1 schematically depicts an exemplary system according to certain embodiments of the present disclosure. As shown in FIG. 1, the system 100 includes a management device 110, and a computing device 150. The management device 110 is communicatively connected to the computing device 150 through a USB interface 130, which may provide a USB link as the communication link between the management device 110 and the computing device 150. In addition to the USB interface 130, although not explicitly shown in FIG. 1, the management device 110 may be further communicatively connected to the computing device 150 via other communication links. Examples of these additional communication links may include, without being limited to, a network or other in-band or out-of band (OOB) interfaces, such as the IPMI-defined in-band KCS, BT, SMIC system interfaces, or other OOB serial interfaces. The network may be a wired or wireless network, and may be of various forms, such as a public network and a private network. Examples of the network may include, but not limited to, a local area network (LAN) or wide area network (WAN) including the Internet. However, for the purpose of the present disclosure, data transfer between the management device 110 and the computing device 150 will be via the USB interface 130.

The USB interface 130 is the communication link between the management device 110 and the computing device 150. Specifically, the USB interface 130 a standardized interface under the USB industry standard that defines the cables, connectors and communications protocols used in a bus for connection, communication, and power supply between computers and electronic devices. USB was designed to standardize the connection of computer peripherals (including keyboards, pointing devices, digital cameras, printers, portable media players, disk drives and network adapters) to personal computers, both to communicate and to supply electric power. The USB interface 130 has become commonplace on other devices, such as smartphones, PDAs and video game consoles. USB has effectively replaced a variety of earlier interfaces, such as serial and parallel ports, as well as separate power chargers for portable devices. Currently, USB allows bi-directional communications between the computing devices and the USB devices, as USB 3.0 allows for device-initiated communications towards the host.

In certain embodiments, the human interface device (HID) standard is used as the data transfer mechanism between the management device 110 and the computing device 150 through the USB interface 130. In the HID protocol, there are two entities: the "host" and the "device." The HID device is the entity that directly interacts with a human, such as a keyboard or mouse. The host communicates with the HID device, and receives input data from the HID device on actions performed by the human. In the present disclosure, the computing device 150 functions as a host computer, and the management device 110 functions as a HID device. However, it should be particularly noted that there may not be any actual human actions directly performed on the management device 110.

Generally, USB communication is based on pipes (logical channels). A pipe is a connection from the host controller at the computing device 150 (which functions as the host computer) to a logical entity found on the management device 110 (which functions as a USB HID device). The logical entity is generally named an "endpoint." Because pipes correspond 1-to-1 to endpoints, the terms are sometimes used interchangeably. A USB device has a default endpoint zero, and could have up to 32 endpoints. The pipes and/or endpoints may be IN (meaning data transaction is from the USB device to the host computer), or may be OUT (data transaction from the host computer to the USB device).

There are two types of pipes: stream and message pipes. A message pipe is bi-directional and is used for control transfers. Message pipes are typically used for short, simple commands to the device, and a status response, used, for example, by the bus control pipe number zero, which corresponds to the endpoint zero. A stream pipe is a uni-directional pipe connected to a uni-directional endpoint that transfers data using an isochronous, interrupt, or bulk transfer. In certain embodiments, a USB HID device such as the management device 110 requires one control endpoint (which can be endpoint zero) and one IN interrupt endpoint.

The management device 110 is a specialized management controller that manages the interface between system management software and platform hardware. In certain embodiments, the management device 110 may be implemented by a system on chip (SoC), such as a BMC or a service processor (SP), or by other management controllers. Different types of sensors can be built into the computing device 150, and the management device 110 reads these sensors to obtain parameters such as temperature, cooling fan speeds, power status, OS status, etc.

In certain embodiments, the management device 110 may include necessary hardware and software components to perform certain predetermined tasks. For example, as shown in FIG. 1, the management device 110 includes a processor 112, a memory 114, and a storage device 116. Further, the management device 110 may include other hardware components and software components (not shown) to perform its corresponding tasks. Examples of these hardware and software components may include, but not limited to, other required memory, interfaces, buses, I/O modules and peripheral devices.

The processor 112 is configured to control operation of the management device 110. In certain embodiments, the processor 112 may be a central processing unit (CPU). The processor 112 can execute any computer executable code or instructions, such as the firmware 120 of the server management device 110 or other applications and instructions of the management device 110. In certain embodiments, the management device 110 may run on more than one processor, such as two processors, four processors, eight processors, or any suitable number of processors.

The memory 114 can be a volatile memory, such as the random-access memory (RAM), for storing the data and information during the operation of the management device 110. In certain embodiments, the memory 114 may be a volatile memory array.

The storage device 116 is a non-volatile data storage media for storing the applications of the management device 110. Examples of the storage device 116 may include non-volatile memory such as flash memory, memory cards, USB drives, hard drives, floppy disks, optical drives, or any other types of data storage devices. In certain embodiments, the management device 110 may have multiple storage devices 116, which may be identical storage devices or different types of storage devices, and the applications may be stored in one or more of the storage devices 116 of the management device 110.

As shown in FIG. 1, the storage device 116 of the management device 110 stores a firmware 120, which may include, among other things, an identification module 122, a determination module 124, and an IPMI module 126. In certain embodiments, the firmware 120 may store other applications necessary for the operation of the management device 110. It should be noted that all of the modules of the firmware 120 are each implemented by computer executable codes or instructions, which collectively forms the firmware 120. In certain embodiments, each of the modules may further include sub-modules. Alternatively, some of the modules may be combined as one stack.

The identification module 122 is configured to identify the management device 110 as a HID device to the computing device 150. Specifically, the identification module 122 may indicate a type of the identified HID device as a generic HID pipe device. Generally, there are certain types of HID devices, such as keyboards, mice, or other HID input devices, which are recognizable by the computing device 150. In certain embodiments, when the management device 110 is connected to the computing device 150 through the USB interface 130, the identification module 122 may send an identifying message to the computing device 150, such that the computing device 150 may recognize the management device as a HID device. Then, the computing device 150 may identify the type of the recognized HID device (i.e., the management device 110) based on the identifying message as the generic HID pipe device, and not any other types of HID devices. In this case, a HID channel is established between the computing device 150 and the generic HID pipe device (i.e., the management device 110) through the USB interface 130.

The determination module 124 is configured to, when the management device 110 receives a message from the computing device 150 through the USB interface 130, determine whether the message is an IPMI message intended for communication with the management device 110, or a HID command intended for communication with the HID device. Specifically, as disclosed above, when the identification module 122 identifies the management device 110 as a generic HID pipe device to the computing device 150, a HID channel is established between the computing device 150 and the generic HID pipe device (i.e., the management device 110) through the USB interface 130. In this case, the computing device 150 may send IPMI messages through the HID channel to the generic HID pipe device (i.e., the management device 110). When the determination module 124 determines that the message received is an IPMI message, the determination module 124 may send the IPMI message to the IPMI module 126 for processing. On the other hand, in certain embodiments, the computing device 150 may send HID commands to communicate with certain HID devices connected to the computing device 150. When the determination module 124 determines that the message received is a HID command, the determination module 124 does nothing, as the management device 110 is not an actual HID device.

The IPMI module 126 is a program of the management device 110 to generate and process IPMI messages. Specifically, when the IPMI module 126 receives an IPMI message, the IPMI module 126 processes the IPMI message. In certain embodiments, based on the processing of the IPMI message, the IPMI module 126 may generate an IPMI response message in response to the IPMI message, and then send the IPMI response message back to its origin. For example, when the IPMI message is from the computing device 150, the IPMI module 126 may process the IPMI message, generate a corresponding IPMI response message, and send the IPMI response message back to the computing device 150 through the HID channel.

The computing device 150 is a host computer of the management device 110. In certain embodiments, the computing device 150 may be a general purpose computer, a specialized computer, or a headless computer. In certain embodiments, the management device 110 may be connected to more than one computing device, and among these computing devices, only the computing device 150 functions as the host computer of the management device 110. In certain embodiments, the computing device 150 may provide a legacy x86 system, which is compatible to the IPMI architecture and provides certain x86 features such as the LPC and the I/O ports. Alternatively, in certain embodiments, the computing device 150 may be a non-x86 system or a legacy free system.

The components of the computing device 150 may include, without being limited to, a processor 152, a memory 154, a basic input/output system (BIOS) chip 156, a storage device 158, and other required memory and I/O modules (not shown). Generally, the computing device 150 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. In certain embodiments, the processor 152, the memory 154, and the BIOS chip 156 may be components embedded on the baseboard, or may be connected to the baseboard through at least one interface. In certain embodiments, the management device 110 may also be a component on the baseboard. In certain embodiments, the interface may be physical hardware interface such as electrical connectors, buses, ports, cables, terminals, or other I/O devices. One of ordinary skill in the art would appreciate that the configuration of the baseboard may be adjusted or changed according to the necessary design or manufacturing requirements. In certain embodiments, the processor 152 and the memory 154 may be similar to the processor 112 and the memory 114 of the management device 110, and details of the processor 152 and the memory 154 is not further elaborated.

The BIOS chip 156 is one of the most crucial components in the computing device 150 or any computer system. In certain embodiments, the BIOS chip 156 includes a non-volatile memory, such as a flash memory chip, an electrically erasable programmable read-only memory (EEPROM) chip or a complementary metal oxide semiconductor (CMOS) memory. The BIOS chip 156 stores BIOS codes (not shown, hereinafter the BIOS). The BIOS is configured to perform the startup functions, or the booting functions, for the computing device 150. Examples of the booting functions include, but are not limited to, the initiation and power-on self-test, identifying the system devices, locating the boot loader software on the boot device, loading and executing the boot loader software and giving it control of the OS 160.

The storage device 158 is a non-volatile data storage media for storing the applications of the computing device 150. Examples of the storage device 158 may include non-volatile memory such as flash memory, memory cards, USB drives, hard drives, floppy disks, optical drives, or any other types of data storage devices. In certain embodiments, the computing device 150 may have multiple storage devices 158, which may be identical storage devices or different types of storage devices, and the applications of the computing device 150 may be stored in one or more of the storage devices 158 of the computing device 150. In certain embodiments, the BIOS chip 156, which includes a non-volatile memory, may also be considered a part of the storage device 158.

As shown in FIG. 1, the storage device 158 of the computing device 150 stores, among other things, an operating system (OS) 160, a HID processing module 162, and an IPMI processing module 164. In certain embodiments, the storage device 158 may store other applications necessary for the operation of the computing device 150. It should be noted that all of the modules of the storage device 158 are each implemented by computer executable codes or instructions, and each of the modules may further include sub-modules distributed in different storage devices 158. Alternatively, some of the modules may be combined as one module. In certain embodiments, functionalities of one of the modules may be provided by multiple independently executed modules.

The OS 160 is a collective management software application managing the operation of the computing device 150. For example, the OS 160 can include a set of functional programs that control and manage operations of the devices connected to the computing device 150. The set of application programs provide certain utility software for the user to manage the computing device 150. In certain embodiments, the OS 160 is operable to multitask, i.e., execute computing tasks in multiple threads. Examples of the OS may be any of the commercial operating systems, such as Microsoft Windows, LINUX, UNIX, or any other operating systems.

The HID processing module 162 is a module for processing the HID features. In certain embodiments, the HID processing module 162 may be implemented by one or more HID drivers. For example, the BIOS in the BIOS chip 156 may contain a HID driver, and the OS 160 may also contain a HID driver. Generally, all OS and BIOS may have HID drivers because most of the input devices available fall under HID. These HID drivers may enable a universal device, such as the management device 110, as a generic HID pipe device. Thus, the HID drivers may be used as the HID processing module 162.

In certain embodiments, the HID processing module 162 may be configured to recognize a device connected to the computing device 150 through the USB interface 130 as a HID device, and then receive an identifying message from the recognized HID device to identify the type of the recognized HID device. Examples of the type of the HID device may include a keyboard, a mouse, or the generic HID pipe device. Thus, the HID processing module 162 may establish a HID channel to the identified HID device through the USB interface 130. If necessary, the HID processing module 162 may generate HID commands for the HID device, and then send the HID commands to the HID device through the HID channel. For example, when the management device 110 is connected to the computing device 150 through the USB interface 130, the HID processing module 162 may recognize the management device 110 as a HID device, and then receive an identifying message from the identification module 122 of the management device 110 to identify the type of the recognized HID device the generic HID pipe device.

The IPMI processing module 164 is a computer program at the computing device 150 that generates and processes IPMI messages. In certain embodiments, the IPMI processing module 164 may be separated from the BIOS and the OS 160 as an independent program. Alternatively, the IPMI processing module 164 may be a part of the BIOS and/or the OS 160, which is compatible to the IPMI architecture for generating and processing IPMI messages. In certain embodiments, when the HID processing module 162 identifies a HID device as a generic HID pipe device, the IPMI processing module 164 may recognize the generic HID pipe device as the management device 110. Thus, the IPMI processing module 164 may generate IPMI messages to be transmitted to the generic HID pipe device (i.e., the management device 110), and transmit the IPMI message to the generic HID pipe device (i.e., the management device 110) through the HID channel. In certain embodiments, when the management device 110 sends an IPMI response message back to the computing device 150 through the HID channel in response to the IPMI messages sent to the generic HID pipe device (i.e., the management device 110), the IPMI processing module 164 may receive the IPMI response message, and process the IPMI response message.

Figure 2:
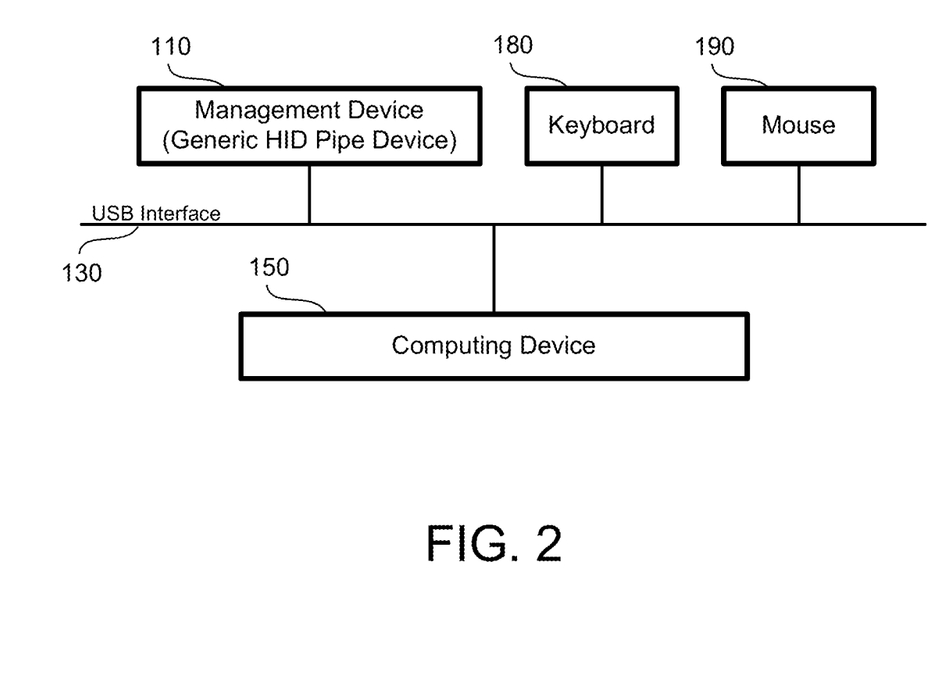
FIG. 2 schematically depicts HID communication between the management device and the computing device according to certain embodiments of the present disclosure.

FIG. 2 schematically depicts HID communication between the management device and the computing device according to certain embodiments of the present disclosure. As shown in FIG. 2, the management device 110 is connected to the computing device 150 through the USB interface 130. On the other hand, the computing device 150 may have other HID devices connected, such as a keyboard 180 and a mouse 190, through the USB interface 130. In this case, each of the HID devices (including the management device 110, the keyboard 180, and the mouse 190) will respectively identify itself to the computing device 150 to indicate the respective type of the HID device. Since the management device 110 is the only HID device that identifies itself as a generic HID pipe device, the IPMI processing module 164 will only communicate with the generic HID pipe device (i.e., the management device 110) using IPMI messages. Thus, the universal IPMI communication between the computing device 150 and the management device 110 may be achieved. Further, the HID processing module 162 may communicate with other HID devices (the keyboard 180, and the mouse 190) with HID commands. If the HID processing module 162 communicates with the generic HID pipe device (i.e., the management device 110) using the HID commands, the management device 110 would simply not respond to the HID commands.

Figure 3:
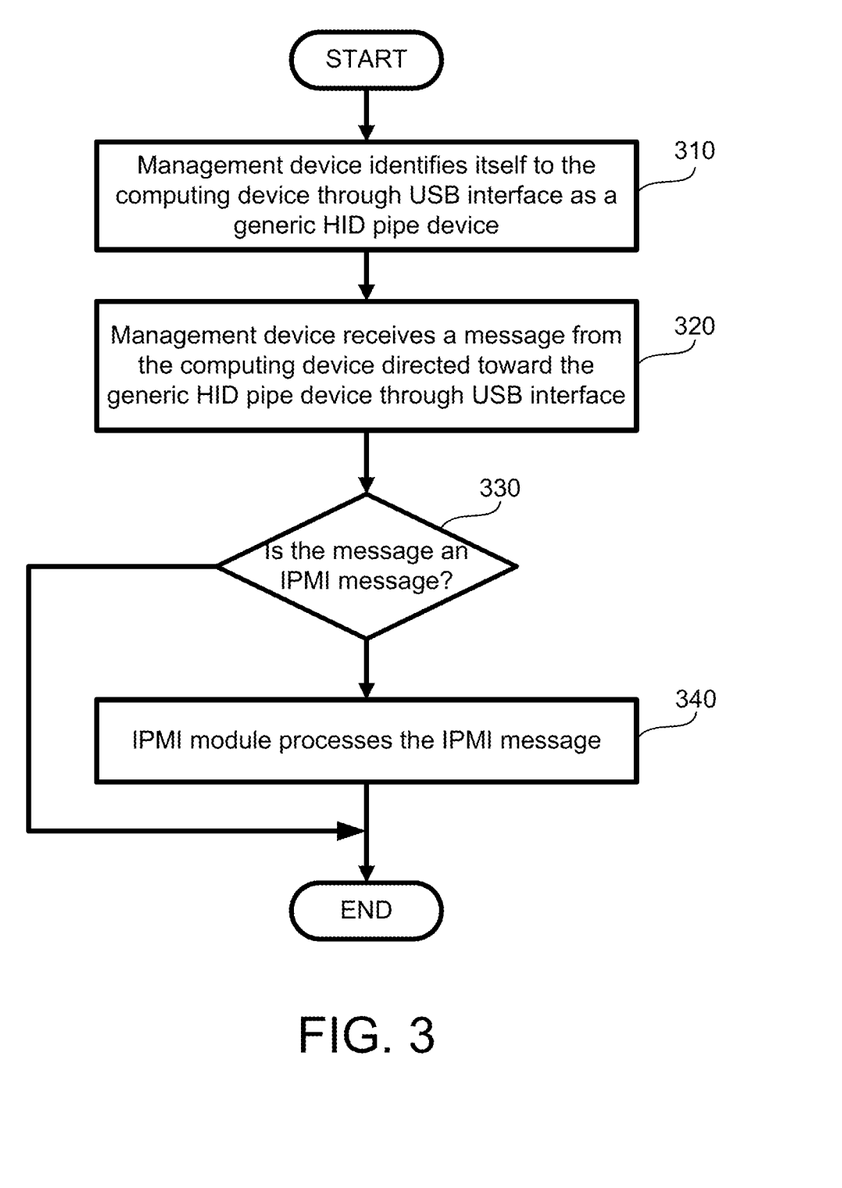
FIG. 3 shows a flowchart of a method for performing a universal IPMI communication between a management device and a computing device according to certain embodiments of the present disclosure.

Another aspect of the present disclosure relates to a computer implemented method of performing a universal IPMI communication between a host computing device and a management device. FIG. 3 shows a flowchart of a method for performing a universal IPMI communication between a management device and a computing device according to certain embodiments of the present disclosure. In certain embodiments, the method may be implemented on a system 100 as shown in FIG. 1. For example, the method may be implemented by the execution of the firmware 120 at the processor 112 of the management device 110 of the system 100. It should be noted that the method as shown in FIG. 3 merely represent certain embodiments of the present disclosure, and is not intended to be exhaustive or to limit the disclosure to the precise forms disclosed.

At procedure 310, the management device 110 may identify itself to the computing device 150 through the USB interface 130 as a generic HID pipe device. Specifically, when the management device 110 is connected to the computing device 150 through the USB interface 130, the HID processing module 162 of the computing device 150 may recognize the management device 110 as a HID device. Then the identification module 122 of the management device 110 may send an identifying message to the computing device 150, such that the HID processing module 162 of the computing device 150 may identify the type of the recognized HID device (i.e., the management device 110) based on the identifying message as the generic HID pipe device, and not any other types of HID devices. Thus, the HID processing module 162 may establish a HID channel to the identified HID device through the USB interface 130.

At procedure 320, the management device 110 receives a message from the computing device 150 directed toward the generic HID pipe device (i.e., the management device 110) through the USB interface 130. In this case, the message may be an IPMI message issued by the IPMI processing module 164 of the computing device 150, which is intended for communication with the management device 110; or may be a HID command issued by the HID processing module 162, which is intended for communication with the HID device.

At procedure 330, the determination module 124 determines whether the message received from the computing device 150 is an IPMI message. When the message is not an IPMI message, the determination module 124 will determine that the message is a HID command, and does nothing, which ends the procedures. Alternatively, when the message is an IPMI message, at procedure 340, the IPMI module 126 processes the IPMI message. In certain embodiments, based on the processing of the IPMI message, the IPMI module 126 may generate an IPMI response message in response to the IPMI message, and then send the IPMI response message back to the computing device 150.

In yet another aspect, the present disclosure relates to a non-transitory computer readable medium storing computer executable code. In certain embodiments, the computer executable code may be at least a part of the firmware 120 of the management device 110 as described above. In certain embodiments, the non-transitory computer readable medium may include, but not limited to, the storage device 116 of the management device 110 as described above, or any other storage media of the management device 110.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a management device communicatively connected to a computing device through a communication link, the management device comprising a processor and a storage device storing computer executable code, wherein the computer executable code, when executed at the processor, is configured to:
identify the management device as a human interface device (HID) device to the computing device through the communication link, wherein a type of the identified HID device is a generic HID pipe device; and
in response to receiving a first message from the computing device directed toward the generic HID pipe device through the communication link,
determine whether the first message is an Intelligent Platform Management Interface (IPMI) message intended for communication with the management device, or an HID command intended for communication with the HID device; and
when the first message is the IPMI message, process the IPMI message,
wherein the computing device comprises:
a HID processing module configured to establish a HID channel to the HID device through the communication link; and
an IPMI processing module configured to, when the HID processing module identifies the HID device as the generic HID pipe device, generate the IPMI message to be transmitted to the generic HID pipe device, and transmit the IPMI message to the generic HID pipe device through the HID channel.

2. The system as claimed in claim 1, wherein the management device is a baseboard management controller (BMC), and the computing device functions as a host computer to the BMC.

3. The system as claimed in claim 1, wherein the computing device is a non-x86 computer device or a legacy free computing device.

4. The system as claimed in claim 1, wherein the communication link is a universal serial bus (USB) link.

5. The system as claimed in claim 1, wherein the HID processing module is further configured to:
recognize a device connected to the computing device through the communication link as the HID device; and
receive an identifying message from the recognized HID device to identify the type of the recognized HID device.

6. The system as claimed in claim 5, wherein the type of the recognized HID device comprises a keyboard, a mouse, and the generic HID pipe device.

7. The system as claimed in claim 1, wherein the computer executable code comprises:
an identification module configured to identify the management device as the generic HID pipe device to the computing device;
a determination module configured to determine whether the first message is the IPMI message or the HID command; and
an IPMI module configured to process the IPMI message.

8. The system as claimed in claim 7, wherein the IPMI processing module is further configured to:
receive an IPMI response message in response to the IPMI message from the generic HID pipe device through the HID channel; and
process the IPMI response message.

9. The system as claimed in claim 8, wherein the IPMI module is further configured to:

generate the IPMI response message in response to the IPMI message; and transmit the IPMI response message to the computing device through the HID channel.

10. A method for performing a universal Intelligent Platform Management Interface (IPMI) communication between a management device and a computing device, comprising:

identifying, by the management device to the computing device through a communication link, the management device as a human interface device (HID) device, wherein a type of the identified HID device is a generic HID pipe device; and in response to receiving, by the management device, a first message from the computing device directed toward the generic HID pipe device through the communication link, determining, by the management device, whether the first message is an IPMI message intended for communication with the management device, or an HID command intended for communication with the HID device; and when the first message is the IPMI message, processing, by the management device, the IPMI message, wherein the computing device comprises:

a HID processing module configured to establish a HID channel to the HID device through the communication link, and an IPMI processing module configured to, when the HID processing module identifies the HID device as the generic HID pipe device, generate the IPMI message to be transmitted to the generic HID pipe device, and transmit the IPMI message to the generic HID pipe device through the HID channel.

11. The method as claimed in claim 10, wherein the management device is a baseboard management controller (BMC), the computing device functions as a host computer to the BMC, and the communication link is a universal serial bus (USB) link.

12. The method as claimed in claim 10, wherein the computing device is a non-x86 computer device or a legacy free computing device.

13. The method as claimed in claim 10, wherein the HID processing module is further configured to:

recognize a device connected to the computing device through the communication link as the HID device; and receive an identifying message from the recognized HID device to identify the type of the recognized HID device.

14. The method as claimed in claim 13, wherein the type of the recognized HID device comprises a keyboard, a mouse, and the generic HID pipe device.

15. The method as claimed in claim 13, wherein the IPMI processing module is further configured to:

receive an IPMI response message in response to the IPMI message from the generic HID pipe device through the HID channel; and process the IPMI response message.

16. The method as claimed in claim 15, further comprising:

generating, by the management device, the IPMI response message in response to the IPMI message; and transmitting, by the management device, the IPMI response message to the computing device through the HID channel.

17. A non-transitory computer readable medium storing computer executable code, wherein the computer executable code, when executed at a processor of a management device, is configured to identify the management device as a human interface device (HID) device to a computing device through a communication link, wherein a type of the identified HID device is a generic HID pipe device; and in response to receiving a first message from the computing device directed toward the generic HID pipe device through the communication link, determine whether the first message is an Intelligent Platform Management Interface (IPMI) message intended for communication with the management device, or an HID command intended for communication with the HID device; and when the first message is the IPMI message, process the IPMI message, wherein the computing device comprises:

a HID processing module configured to establish a HID channel to the HID device through the communication link, and an IPMI processing module configured to, when the HID processing module identifies the HID device as the generic HID pipe device, generate the IPMI message to be transmitted to the generic HID pipe device, and transmit the IPMI message to the generic HID pipe device through the HID channel.

18. The non-transitory computer readable medium as claimed in claim 17, wherein the management device is a baseboard management controller (BMC), the computing device functions as a host computer to the BMC, and the communication link is a universal serial bus (USB) link.

19. The non-transitory computer readable medium as claimed in claim 17, wherein the computing device is a non-x86 computer device or a legacy free computing device.

20. The non-transitory computer readable medium as claimed in claim 17, wherein the HID processing module is further configured to:

recognize a device connected to the computing device through the communication link as the HID device; and receive an identifying message from the recognized HID device to identify the type of the recognized HID device.

21. The non-transitory computer readable medium as claimed in claim 20, wherein the type of the recognized HID device comprises a keyboard, a mouse, and the generic HID pipe device.

22. The non-transitory computer readable medium as claimed in claim 20, wherein the computer executable code comprises:

an identification module configured to identify the management device as the generic HID pipe device to the computing device;

a determination module configured to determine whether the first message is the IPMI message or the HID command; and an IPMI module configured to process the IPMI message.

23. The non-transitory computer readable medium as claimed in claim 22, wherein the IPMI processing module is further configured to:

receive an IPMI response message in response to the IPMI message from the generic HID pipe device through the HID channel; and process the IPMI response message.

24. The non-transitory computer readable medium as claimed in claim 23, wherein the IPMI module is further configured to:
   generate the IPMI response message in response to the IPMI message; and
   transmit the IPMI response message to the computing device through the HID channel.

\* \* \* \* \*